US007765204B2

(12) United States Patent
Gollapudi et al.

(10) Patent No.: US 7,765,204 B2
(45) Date of Patent: Jul. 27, 2010

(54) METHOD OF FINDING CANDIDATE SUB-QUERIES FROM LONGER QUERIES

(75) Inventors: Sreenivas Gollapudi, Cupertino, CA (US); Rina Panigrahy, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 356 days.

(21) Appl. No.: 11/863,045

(22) Filed: Sep. 27, 2007

(65) Prior Publication Data

US 2009/0089266 A1    Apr. 2, 2009

(51) Int. Cl.
*G06F 17/30* (2006.01)

(52) U.S. Cl. ..................................................... 707/721
(58) Field of Classification Search .................. 707/721
See application file for complete search history.

(56) References Cited

U.S. PATENT DOCUMENTS

| | | | |
|---|---|---|---|
| 5,202,985 A * | 4/1993 | Goyal .............................. 707/4 |
| 6,169,986 B1 | 1/2001 | Bowman et al. |
| 6,363,377 B1 | 3/2002 | Kravets et al. |
| 6,691,109 B2 | 2/2004 | Bjornson et al. |
| 6,804,677 B2 * | 10/2004 | Shadmon et al. ............. 707/101 |
| 7,051,023 B2 | 5/2006 | Kapur et al. |
| 7,136,845 B2 | 11/2006 | Chandrasekar et al. |
| 7,424,467 B2 * | 9/2008 | Fontoura et al. ................ 707/2 |
| 7,472,114 B1 * | 12/2008 | Rowney et al. ................. 707/3 |
| 7,574,409 B2 * | 8/2009 | Patinkin ....................... 706/12 |
| 7,584,204 B2 * | 9/2009 | Kapoor et al. ............... 707/102 |
| 7,599,931 B2 * | 10/2009 | Shi et al. ........................ 707/6 |
| 2002/0120598 A1 * | 8/2002 | Shadmon et al. ................ 707/1 |
| 2003/0055813 A1 | 3/2003 | Chaudhuri et al. |
| 2004/0225645 A1 * | 11/2004 | Rowney et al. ................. 707/3 |
| 2004/0254920 A1 | 12/2004 | Brill et al. |
| 2005/0027723 A1 * | 2/2005 | Jones et al. .................. 707/100 |
| 2005/0033733 A1 * | 2/2005 | Shadmon et al. ................ 707/2 |
| 2005/0055341 A1 | 3/2005 | Haahr et al. |

(Continued)

OTHER PUBLICATIONS

Chaudhuri, S., Ganjam, K., Ganti, V., and Motwani, R. 2003. Robust and efficient fuzzy match for online data cleaning. In Proceedings of the 2003 ACM SIGMOD international Conference on Management of Data (San Diego, California, Jun. 9-12, 2003). SIGMOD '03. ACM, New York, NY, 313-324. DOI= http://doi.acm.org/10.1145/872757.872796.*

(Continued)

*Primary Examiner*—Neveen Abel Jalil
*Assistant Examiner*—Mark Andrew X Radtke
(74) *Attorney, Agent, or Firm*—Vierra Magen Marcus & DeNiro LLP

(57) ABSTRACT

A method is disclosed for identifying queries stored in a log which are semantically related to an input query that may include a large number of terms. A set of one or more subsequences are generated for each query stored in the log, and these sets of subsequences are stored in a lookup table. A set of one or more subsequences are also generated for the input query. The subsequences in the lookup table and of the input query are generated by hashing of the respective query terms to a value between 0 and 1 using a known technique of min-hashing. The present system then constructs the subsequences of the query using the k-min hashes of the query, where k is an integer based on the number of terms in the query.

20 Claims, 8 Drawing Sheets

U.S. PATENT DOCUMENTS

| | | | |
|---|---|---|---|
| 2005/0086252 A1* | 4/2005 | Jones et al. | 707/102 |
| 2005/0108339 A1* | 5/2005 | Gleeson et al. | 709/206 |
| 2005/0108340 A1* | 5/2005 | Gleeson et al. | 709/206 |
| 2005/0132197 A1* | 6/2005 | Medlar | 713/176 |
| 2005/0165838 A1* | 7/2005 | Fontoura et al. | 707/104.1 |
| 2005/0283473 A1* | 12/2005 | Rousso et al. | 707/5 |
| 2006/0095521 A1* | 5/2006 | Patinkin | 709/206 |
| 2006/0168006 A1* | 7/2006 | Shannon et al. | 709/206 |
| 2006/0184549 A1* | 8/2006 | Rowney et al. | 707/100 |
| 2006/0195425 A1* | 8/2006 | Deem et al. | 707/3 |
| 2006/0218123 A1* | 9/2006 | Chowdhuri et al. | 707/2 |
| 2006/0224589 A1* | 10/2006 | Rowney et al. | 707/9 |
| 2006/0253439 A1 | 11/2006 | Ren et al. | |
| 2006/0282456 A1* | 12/2006 | Kapoor et al. | 707/102 |
| 2007/0005556 A1* | 1/2007 | Ganti et al. | 707/1 |
| 2007/0112714 A1* | 5/2007 | Fairweather | 706/46 |
| 2007/0124698 A1* | 5/2007 | Majumder | 715/811 |
| 2007/0208703 A1* | 9/2007 | Shi et al. | 707/3 |
| 2007/0271268 A1* | 11/2007 | Fontoura et al. | 707/6 |
| 2008/0243764 A1* | 10/2008 | Meijer et al. | 707/2 |
| 2008/0256143 A1* | 10/2008 | Reddy et al. | 707/204 |
| 2009/0049062 A1* | 2/2009 | Chitrapura et al. | 707/100 |

OTHER PUBLICATIONS

Haveliwala, T. H., Gionis, A., Klein, D., and Indyk, P. 2002. Evaluating strategies for similarity search on the web. In Proceedings of the 11th international Conference on World Wide Web (Honolulu, Hawaii, USA, May 7-11, 2002). WWW '02. ACM, New York, NY, 432-442. DOI= http://doi.acm.org/10.1145/511446.511502.*

Gollapudi, S. and Panigrahy, R. 2006. Exploiting asymmetry in hierarchical topic extraction. In Proceedings of the 15th ACM international Conference on information and Knowledge Management (Arlington, Virginia, USA, Nov. 6-11, 2006). CIKM '06. ACM, New York, NY, 475-482. DOI= http://doi.acm.org/10.1145/1183614.1183683.*

Kumaran et al., A Case for Shorter Queries, and Helping Users Create Them, Proceedings of NAACL HLT, Association for Computational Linguistics, Apr. 2007, pp. 220-227 http://maroo.cs.umass.edu/pub/web/getpdf.php?id=681.

Takaki et al., Associative Document Retrieval by Query Subtopic Analysis and its Application to Invalidity Patent Search, CIKM'04, Nov. 8-13, 2004 http://if-lab.slis.tsukuba.ac.jp/fujii/paper/cikm2004.pdf.

Kumaran, Efficient User Interaction in Information Retrieval, 2007, pp. 1-71 http://www.cs.umass.edu/~giridhar/Papers/proposal.pdf, USA.

* cited by examiner

Hashing

Min Hash: E k-Min Hash for k=2: E C k-Min Hash for k=3: E C D k-Min Hash for k=4: E C D X

Fig. 6

Ordered min Hash: C

Ordered k-Min Hash for k=2: C E

Ordered k-Min Hash for k=3: C D E

Ordered k-Min Hash for k=4: C D E X

Hashing

A → 0.25
B → 0.7
C → 0.1
D → 0.15
E → 0.05
F → 0.6 k-Min Hash for k=4:  E C D A k-Min Hash for k=3:  E C D k-Min Hash for k=2:  E C Min Hash:  E Ordered k-Min Hash for k=4:  A C D E Ordered k-Min Hash for k=3:  C D E Ordered k-Min Hash for k=2:  C E Ordered Min Hash:  E

Fig. 11

Input Query: A B C D E F ⟵ 400

Ordered Min Hashes:

A C D E  (for k=4)

C D E  (for k=3)

C E  (for k=2)

E  (for k=1)

| Log Entry (206) | k-min hash table (208) | | | | Match? |
|---|---|---|---|---|---|
| ⋮ | ⋮ | ⋮ | ⋮ | ⋮ | |
| T G X | G | G X | | | |
| C D E R | E | C E | C D E | | ✓ |
| B D S W | S | D S | B D S | | |
| C D E F X | E | C E | C D E | C D E X | ✓ |
| ⋮ | ⋮ | ⋮ | ⋮ | ⋮ | |

Results for C D E R:  1.
2.
3.
⋮

METHOD OF FINDING CANDIDATE SUB-QUERIES FROM LONGER QUERIES

BACKGROUND

Search engines are a powerful tool for sifting through vast amounts of stored information in a structured and discriminating scheme. Popular search engines such as MSN®, Google® and Yahoo!® service tens of millions of queries for information every day. A typical search engine for use in finding documents on the World Wide Web operates by a coordinated set of programs including a spider (also referred to as a "crawler" or "bot") that gathers information from web pages on the World Wide Web in order to create entries for a search engine index, or log; an indexing program that creates the log from the web pages that have been read; and a search program that receives a search query, compares it to the entries in the log, and returns results appropriate to the search query.

A current area of significant research in the field of search engine technology is how to improve the efficiency and quality of results for a given search query. So called concept-based searching involves using statistical analysis on various search criteria in order to identify and suggest alternative search queries that are highly semantically related to the input search query. Identifying alternative, highly correlated search queries can help focus and improve the search results for a given search. Moreover, companies and advertisers present advertising when particular queries are entered. It would be extremely beneficial to such companies and advertisers to associate their advertising with particular queries as well as other semantically related queries.

In an example of a prior art system employing concept-based searching, queries are correlated together depending on the degree to which results returned in the respective queries are the same. Thus, if first and second queries return nearly identical search results, these two queries would be considered highly correlated with each other. Another popular search technology relates to analyzing and comparing the semantic input queries themselves to the entries in the database log. If two queries are found to be semantically related, then the search results returned by the respective queries should be highly correlated.

In search engines used for web searches and other database searches, long queries are often difficult to handle. Conventional approaches to searching use all query terms as a conjunction. Accordingly, long queries may produce no results. Moreover, processing long queries is computationally difficult. It may be possible to scan all the entries in the log, which may often include millions of entries, and compare each of the entries with the original query. Each of these comparisons in turn is an expensive operation (quadratic in the length of the strings). Therefore, this approach is not feasible for large query logs and long strings.

SUMMARY

Embodiments of the present system relate to a method of identifying queries stored in a log that are semantically related to an input query which may include a large number of terms. A set of one or more subsequences are generated for each query stored in the log, and these sets of subsequences are stored in a lookup table. A set of one or more subsequences are also generated for the input query. Matching queries are obtained by comparing the input query subsequences against the subsequences stored in the lookup table.

The subsequences in the lookup table and of the input query are generated by hashing of the respective query terms, or tokens, to a value between 0 and 1 using a known technique of min-hashing. The present system then constructs the subsequences of the query based on the values of the hashed tokens. The one or more subsequences of a given query are the k-min hashes of the query, where k is an integer which may vary between 1 and m. For example, a k-min hash for k=2 is a min hash including the two tokens having the two lowest hashed values of all tokens in the input query. The upper bound of k is m. m may be arbitrarily selected as some percentage of the number of search terms in a query.

Once a k-min hash is obtained, it is ordered so that the tokens in the min-hash appear in the same order in which the tokens appear in the query from which the min hash is derived. The ordered k-min hash sequences of the input query are then compared against the ordered k-min hash sequences in the lookup table. Where there is a match between a k-min hash of the entered query and a k-min hash of a stored log entry, the stored and entered queries may be semantically related, and the results for the matching stored log entry are returned and provided to the user as search results.

BRIEF DESCRIPTION OF THE DRAWINGS

FIG. 4 shows an example of a query stored within a database log where the tokens of the query are hashed to a value of between 0 and 1.

FIG. 5 shows different min hashes which may be formed from the stored query of FIG. 4.

FIG. 6 shows the min hashes of FIG. 5 ordered in the same sequence as the stored query of FIG. 4.

FIG. 11 shows an example of min hashes of an input query compared against min hashes within a lookup table.

DETAILED DESCRIPTION

Figure 1:
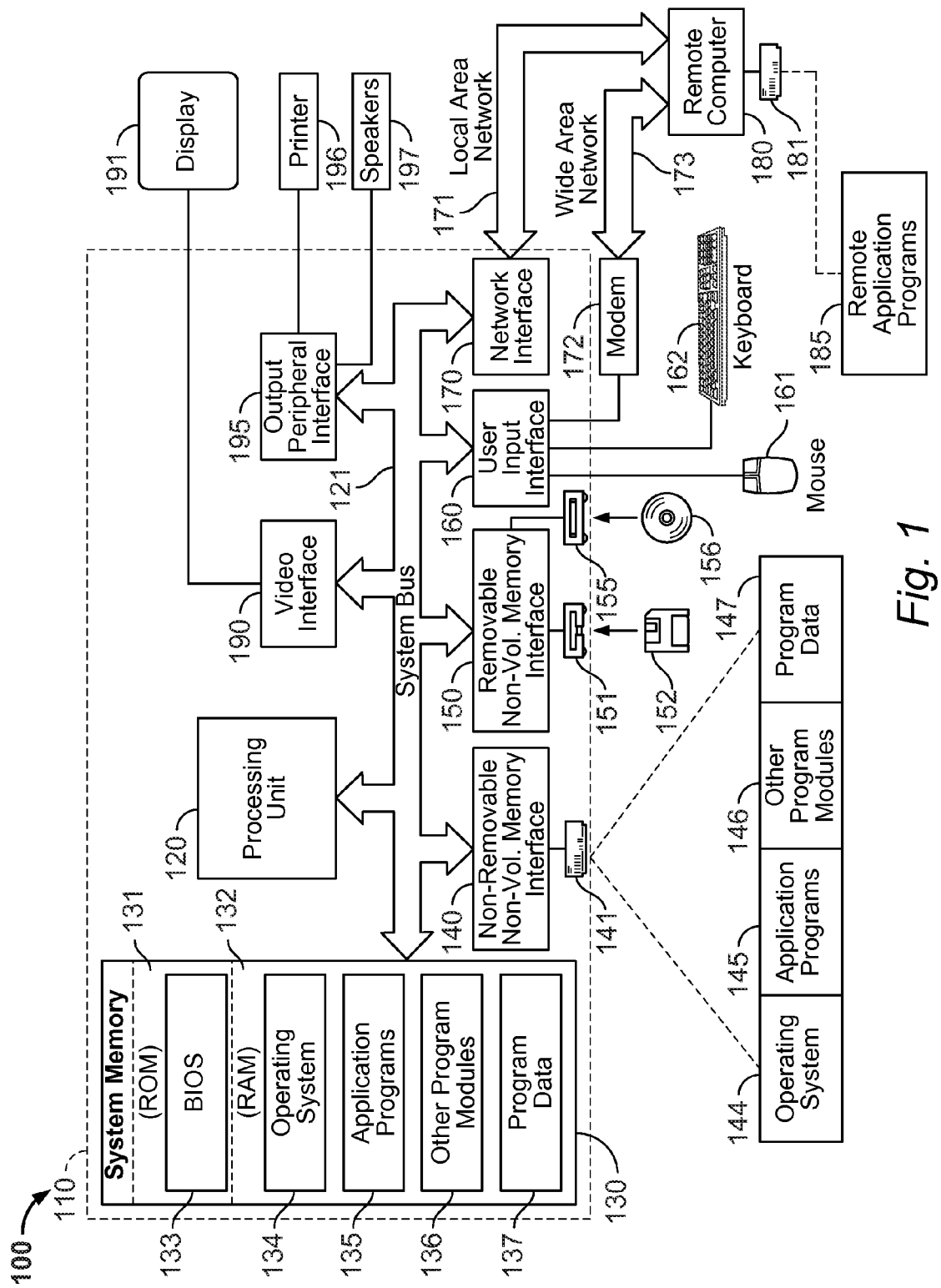
FIG. 1 is a block diagram of a computing environment capable of performing embodiments of the present method.

Embodiments of the invention will now be described with reference to FIGS. 1-12, which in general relate to methods for finding semantically related search engine queries for long input queries. The method uses hashing and an efficient algorithm for comparing ordered sub-sequences of a long input query against entries in the stored query log to find the best semantically matching candidates. The methods described herein can be performed on a variety of processing systems. FIG. 1 illustrates an example of a suitable general computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency or requirement relating to any one or combination of components illustrated in the exemplary computing system environment 100.

The invention is operational with numerous other general purpose or special purpose computing systems, environments or configurations. Examples of well known computing systems, environments and/or configurations that may be suitable for use with the invention include, but are not limited to, personal computers, server computers, multiprocessor systems, microprocessor-based systems, set top boxes, programmable consumer electronics, network PCs, minicomputers, mainframe computers, laptop and palm computers, hand held devices, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communication network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVDs) or other optical disk storage, magnetic cassettes, magnetic tapes, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, DVDs, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. These components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communication over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
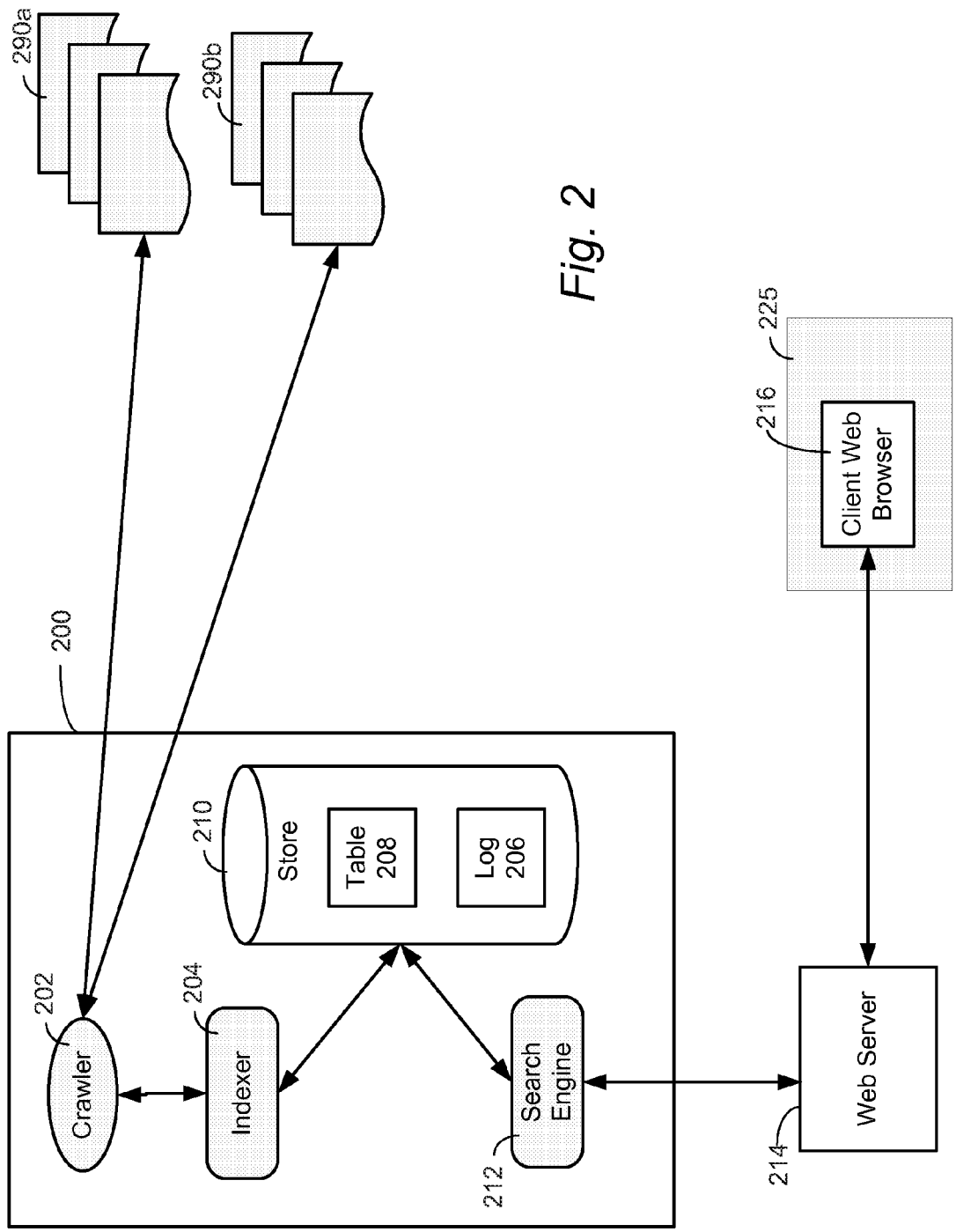
FIG. 2 is a block diagram of a search engine environment capable of carrying out embodiments of the present method.
Figure 3:
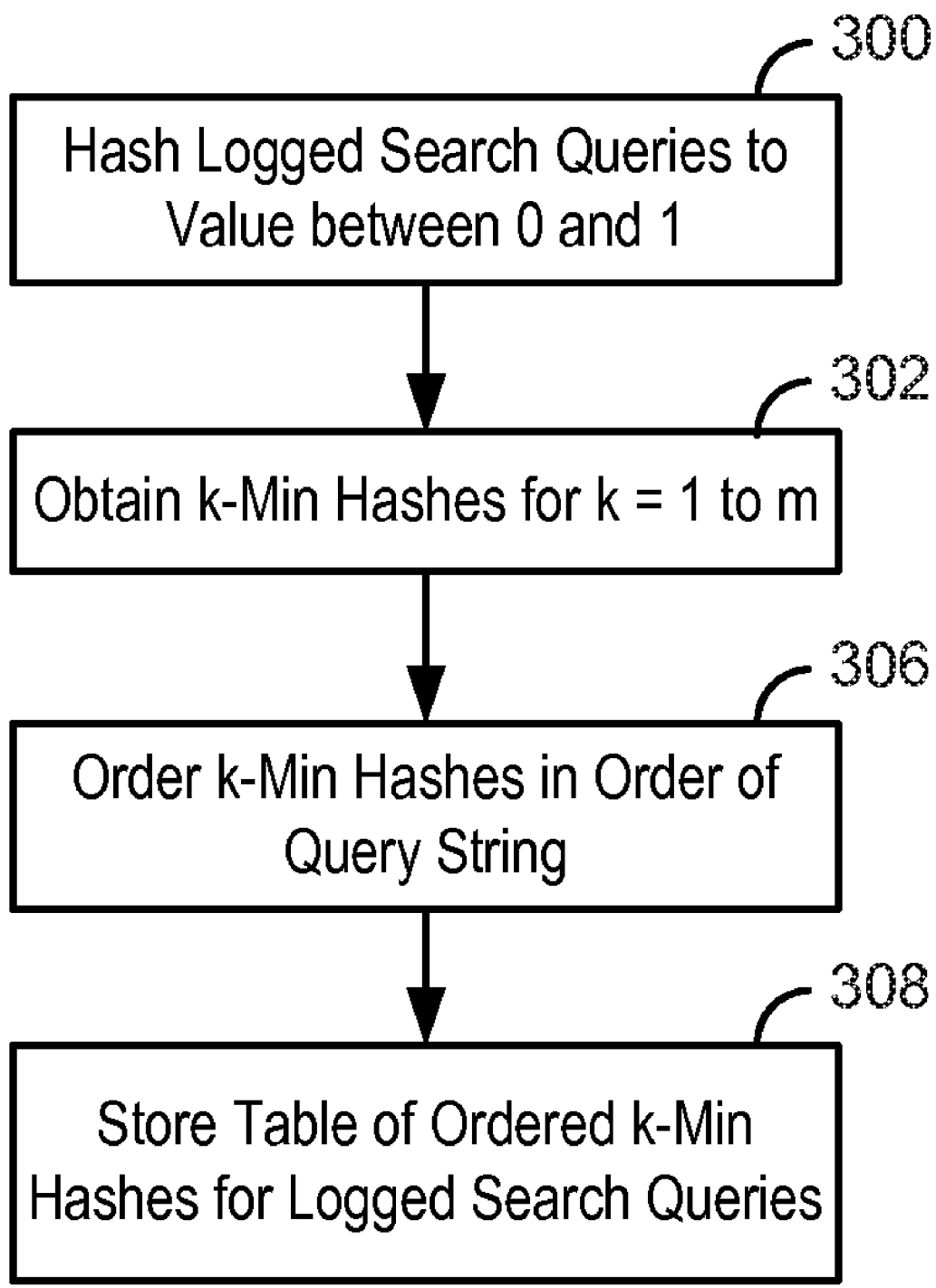
FIG. 3 is a block diagram for forming a lookup table of min hashes for queries stored within a log.

FIG. 2 is a block diagram of a search processing environment 200 including software modules and data structure on which the present invention may be implemented. The search processing environment 200 can operate with and/or as part of the computing system environment 100 described above. Search processing environment 200 may be a crawler-based system having three major elements. First is the spider, also called the crawler 202. The spider visits a web page 290a, 290b, reads it, and then follows links to other pages within the site. The spider 202 returns to the site on a regular basis to look for changes. The basic algorithm executed by any web crawler takes a list of seed URLs as its input and repeatedly: remove a URL from the URL list, determine the IP address of its host name, download the corresponding document, and extract any links contained in it. For each of the extracted links, the crawler will translate it to an absolute URL (if necessary), and add it to the list of URLs to download, provided it has not been encountered before. If desired, the crawler will process the downloaded document in other ways (e.g., index its content).

Everything the spider finds goes into the second part of the search engine, data store 210. The store 210 is a repository containing a copy of every web page that the spider finds. If a web page changes, then data store 210 is updated with new information. The data store further includes a log 206 of all search queries received by the search engine 212, explained below. Additionally, in accordance with the present invention, the data store 210 further includes a lookup table 208 which includes a number of ordered subsequences of each entry within log 206. The number of ordered subsequences of each particular log entry may vary in embodiments, but may advantageously be less than all possible subsequences of the particular log entry. The lookup table 208 is explained in greater detail hereinafter.

The third part of the search processing environment 200 is search engine 212. This is the program that sifts through the millions of pages recorded in the log to find matches to a search and rank them in order of what it believes is most relevant. Searching through the log involves a user building a query and submitting it through the search engine 212. The query can be quite simple, a single word at minimum, but embodiments of the present system is particularly useful in handling long queries.

In practice, a user of computing device 225 accesses search processing environment 200 via a web browser 216 on the client side and a web server 214 on the host side. Once a communication link is established between client and host, a user of computing device 225 may perform query searches as described above.

As explained in the Background section, long search queries present special difficulties in that it is rare that logged search entries will match all of the terms in the long search query, and a brute force search of all terms in the search query against all logged entries consumes excessive time and resources. Accordingly, a method for finding semantically related candidates for long search queries according to an embodiment of the present system will now be explained with reference to FIGS. 3-11.

In general, the present system operates by hashing all terms, or tokens, of an input search query to a value of between 0 and 1 using a known min hashing algorithm. The present system then constructs subsequences of the input query based on the values of the hashed tokens. The term "k-min hash" is used herein to refer to a min hash of k tokens, where k is an integer which may vary between 1 and m. A k-min hash for k=1 is a min hash including a single token having the lowest hashed value of all tokens in the input query. A k-min hash for k=2 is a min hash including the two tokens having the two lowest hashed values of all tokens in the input query. A k-min hash for k=3 is a min hash including the three tokens having the three lowest hashed values, etc.

The upper bound of k is m. m may be arbitrarily selected as some percentage of the number of search terms in a query. In one embodiment, m may be selected to be between 30% to 70% of the number of search terms (rounded up or down to a whole value) or between 50% to 60% of the number of search terms (again, rounded up or down to a whole value). m may be selected other ways based on the number of terms in a query. For example, for queries of 4 or more terms, m may increase by one for the addition of every three terms, such as for example shown partially in the following table 1.

TABLE 1

| Number of Terms in Query: | m: |
| --- | --- |
| 4-6 | 3 |
| 7-9 | 4 |
| 10-12 | 5 |
| 13-15 | 6 |
| 16-18 | 7 |
| 19-21 | 8 |

It is understood that these values of m are selected by way of example only and may vary in alternative embodiments to be any of a variety of values less than the number of search terms. Although unnecessarily long, m may be selected to be equal to the number of search terms in a query in further embodiments.

k-min hash sequences are compared against k-min hash sequences in lookup table 208 which are similarly calculated from the stored queries in log 206. Where there is a match between a k-min hash of the entered query and a k-min hash of a stored log entry, the stored and entered queries may be semantically related, and the results for the matching stored log entry are returned and provided to the user as search results.

The log 206 includes all stored query entries over some historical period. The log may be regenerated periodically from the most recent query submissions to reflect current search trends. As indicated above, a lookup table 208 exists of subsequences of each log entry in log 206. The generation of the subsequences is now explained with reference to the flowchart of FIG. 3. In step 300, a hash generator may hash the terms forming each of the logged query entries. The hash generator may use the min hash algorithm to generate a number between 0 and 1 for each of the terms within a search query. Details of the min hash algorithm are known and set forth for example in A. Broder, "On the resemblance and containment of documents," *In Compression and Complexity of Sequences* (SEQUENCES '97), 1998; and E. Cohen, "Size estimation framework with applications to transitive closure and reachability," *Journal of Computer and System Sciences*, 1997.

An example of the min hash algorithm is shown in FIG. 4. A given query comprised of the terms, or tokens, "C D E F X" may be logged within log 206. In this example, the tokens in the illustrative query are shown as letters, but may represent words, letters, numbers or combinations thereof. The length is also by way of example and may be longer or shorter than shown. Upon application of the min hash algorithm to each of the tokens in the query "C D E F X," it may be determined that the respective tokens have the following hashed values:

C: 0.1
D: 0.15
E: 0.05
F: 0.6
X: 0.5

These values will vary between 0 and 1, but the particular assigned values shown above are by way of example only.

In step 302, an algorithm may be used to obtain a number of k-min hashes for each logged search query. The number, m, may be some arbitrarily selected number smaller than the total length of the particular logged query being examined. Thus, in an embodiment, for the search term C D E F X, m may be selected as four. For the search query C D E F X having hashed values as described above and shown in FIG. 4, the minimum hashed value is 0.05, associated with the term E. Thus, referring now to FIG. 5, the k-min hash for k=1 is E. The two lowest hashed values in this example are 0.05 for E and 0.1 for C. Accordingly, the k-min hash for k=2 is E C. Continuing, in this way, the k-min hash for k=3 is E C D. And the k-min hash for k=m=4 is E C D X.

Embodiments of the present system obtain k-min hashes for a given stored query, but the algorithm also maintains the order of the terms as presented in the stored query. That is, once it is determined which terms comprise a k-min hash, the terms in the k-min hash are organized in the same order in which they appear in the query. Thus, referring to FIGS. 3 and 6, in step 306, the ordered k-min hash terms are obtained. The ordered k-min hash for k=1 is E. The ordered k-min hash for k=2 is C E. The ordered k-min hash for k=3 is C D E. And the ordered k-min hash for k=m=4 is C D E X.

In step 308, the ordered k-min hashes for k=1 to m are stored in the lookup table 208. Thus, each query in the log 206 may have a set of associated subsequence min hashes stored in lookup table 208. As indicated above, the log 206 may be periodically updated, at which times, the subsequences for the queries in log 206 may be recalculated and stored in lookup table 208.

As discussed in the Background section, long search queries input to conventional search engines often return no results. A method for finding the closest matching queries within log 206 to a long input query will now be explained with reference to the flowchart of FIG. 7. In embodiments, the method described with respect to FIG. 7 may be implemented after a search engine has determined that the log does not contain any exact matches to an input search query. Alternatively, the method described with respect to FIG. 7 may be used in the place of conventional searching techniques to return the best search results to an input query.

Figure 7:
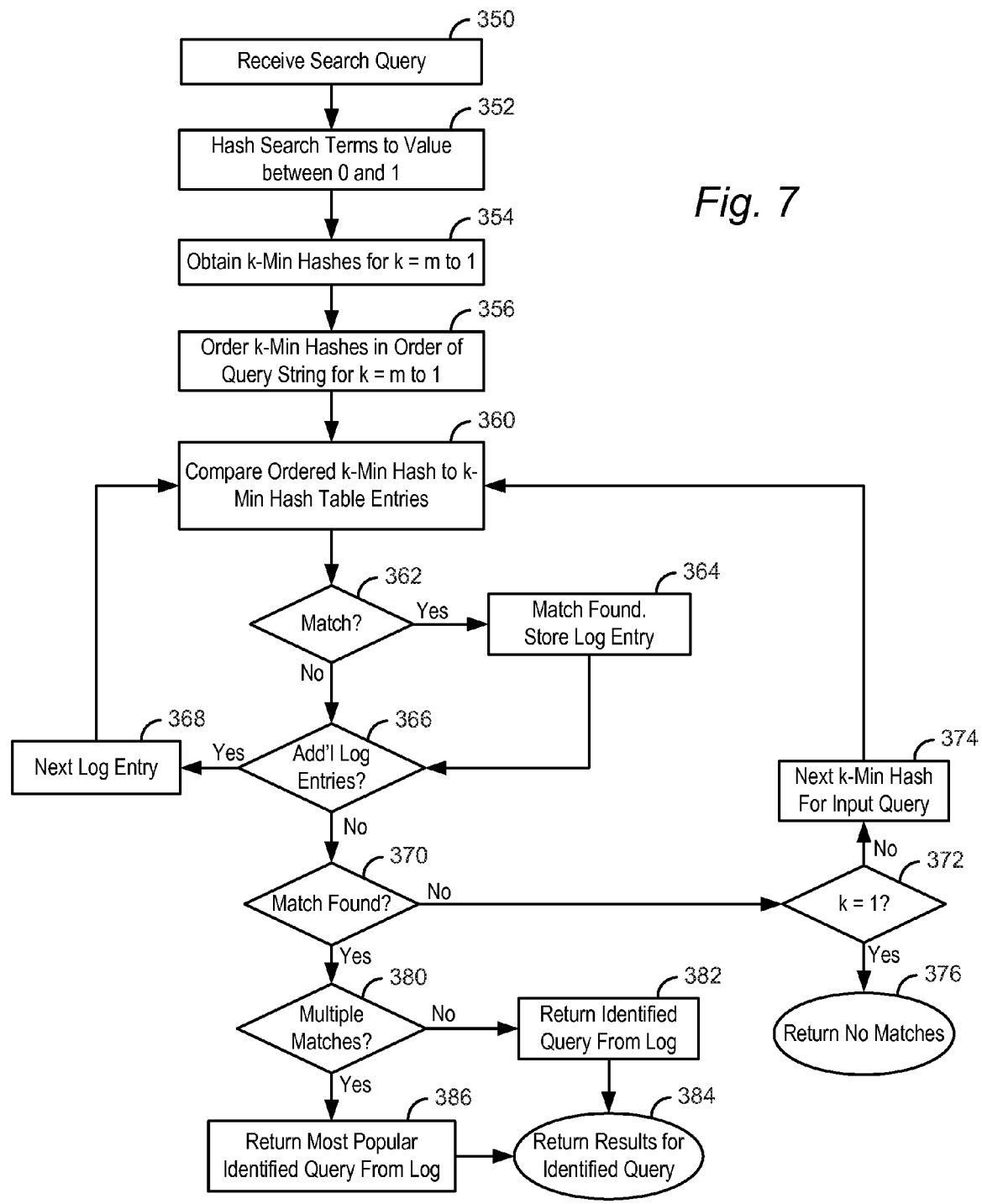
FIG. 7 is a flowchart of an embodiment of the present system for finding stored search queries which are highly correlated to a long input query.
Figures 8, 9, 10:
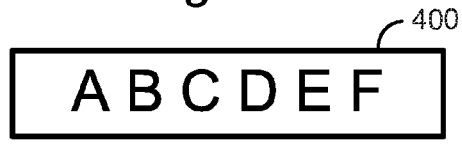
FIG. 8 shows an example of an input query where the tokens of the query are hashed to a value of between 0 and 1.
FIG. 9 shows different min hashes which may be formed from the input query of FIG. 8.
FIG. 10 shows the min hashes of FIG. 9 ordered in the same sequence as the input query of FIG. 8.

Referring now to FIG. 7, the search engine algorithm according to the present system receives a search query in step 350. For example, a user may input a query 400, as shown in FIG. 8, of A B C D E F. In query 400, the tokens are shown as letters, but may represent words, letters, numbers or combinations thereof. The length of query 400 is also by way of example and may be longer or shorter than shown. In step 352, each of the tokens in the query received in step 350 are hashed to a value of between 0 and 1 using the known min hash algorithm as described above with respect to step 300 in the flowchart of FIG. 3.

As shown in FIG. 8, upon application of the min hash algorithm to each of the tokens in the query "A B C D E F," it may be determined that the terms have the following hashed values shown in FIG. 8.

A: 0.25
B: 0.7
C: 0.1
D: 0.15
E: 0.05
F: 0.6

These values will vary between 0 and 1, but the particular assigned values shown above are by way of example only.

In steps 354 and 356, the search engine algorithm obtains the k-min hashes for the input search query 400 for k=1 to m and orders the k-min hashes in the same sequence in which they appear in input query 400. As indicated above, the value for m may be arbitrarily chosen based on the length of the input query 400, and in embodiments may be shorter than the length of query 400. For example, referring to FIG. 9, assuming a value of m=4 for the input query 400, the k-min hash for k=4 is E C D A. The k-min hash for k=3 is E C D. The k-min hash for k=2 is E C and the k-min hash for k=1 is E. FIG. 10 shows the same k-min hashes in the order in which they appear within query 400. Mainly, the ordered k-min hash for k=4 is A C D E. The ordered k-min hash for k=3 is C D E. The ordered k-min hash for k=2 is C E. The ordered k-min hash for k=1 is E.

In the embodiment of FIG. 7, all k-min hashes and ordered k-min hashes are computed before the comparison step 360 explained below. In an alternative embodiment, the ordered min hashes may be determined one at a time and then the comparison performed. In this embodiment, only after a given ordered k-min hash results in no matches would the next ordered k-min hash be determined.

In step 360, the search engine algorithm of the present system compares the first ordered min hash term for query 400 against the min hash terms in lookup table 208 for each of the queries stored in log 206. In the embodiment of FIG. 7, the search engine starts with the largest hashed sequence for comparison against the sequences in lookup table 208. Accordingly, the first min hash used is the min hash for k=m. In steps 362 through 368, the k-min hash of query 400 for k=m is compared against all of the min hashes stored in table 208. In particular, the min hash of query 400 is first compared against the set of min hashes in table 208 for the first query stored in log 206. If a match is found between the k-min hash of the query 400 and a min hash in the set of min hashes for the first query in log 206, that first query is stored in a buffer in step 362. The algorithm then checks whether there are additional queries stored in log 206. If so, the next log entry is taken in step 368 and the set of min hashes in table 208 for that next log entry are compared with the current k-min hash of input query 400.

If in step 366 it is determined that all of the log entries have been compared against the current k-min hash of query 400, the algorithm next checks in step 370 whether one or more matches were found for the k-min hash of input query 400. If no matches are found, the algorithm next determines whether there are additional k-min hashes for input query 400. If there are additional k-min hashes (i.e., k has not yet decreased to one), the next k-min hash is taken in step 374 and the algorithm returns to step 360. In the embodiment of FIG. 7, the next k-min hash is obtained by decreasing k by 1. Thus, in an embodiment where m equals for example 4, the algorithm initially takes the min hash having four tokens from input query 400 and compares that sequence against all stored min hashes in table 208. If no matches are found, the algorithm next proceeds to the 3-min hash having three tokens from input query 400 and repeats steps 360 through 368 to see if any min hashes in table 208 match the tokens in the 3-min hash of input query 400, and so on.

If k is at 1 after steps 360 through 370 and no matches have been found in step 370, that means that not even a single min hash token of input query 400 matches a stored min hash in table 208, and the algorithm indicates that no matches were identified in step 376. Although theoretically possible, in practice, at least one match for a small enough value of k will generally be found, and step 376 will not be reached.

If, in step 370, one or more matches have been found for a given k-min hash of input query 400, the algorithm next checks in step 380 whether multiple matches have been stored in the buffer in step 364. If there was a single k-min hash of table 208 that was found to match the k-min hash of input query 400, the query stored in log 206 from which the matched k-min hash of table 208 is taken is returned in step 382. In step 384, a search is performed by search engine 212 using the stored query identified in steps 382, and the results for that search of the identified query in log 206 are returned to the user as the most closely correlated search results to input query 400.

Conversely, if it is determined in step 380 that multiple min hashes were found in table 208 to match a given k-min hash of input query 400, the algorithm may return the most popular query of the matched min hashes in step 386, and perform a search to obtain the search results for that most popular query, which are then returned to the user in step 384. The information of how many times users entered each stored query is also stored in data store 210. Where there are multiple matches in log 206 identified as matching the input query, the most popular will be the most frequently entered query of the matching stored query.

An example of the method described in the flowchart of FIG. 7 is shown in FIG. 11. FIG. 11 shows the input query 400 described above of A B C D E F, having ordered min hashes of A C D E for k=4, C D E for k=3, C E for k=2, and E for k=1. FIG. 11 also shows a few example queries in log 206 and their associated set of k-min hashes in lookup table 208. As shown and as indicated above, different length queries in log 206 may have differing numbers of min hashes. In the example of FIG. 11, the search engine algorithm may initially try to find matches for the min hash with the largest number of tokens, i.e., A C D E. In the example of FIG. 11, the search engine algorithm may use that min hash in steps 360 through 370 and find no matches. The next min hash, C D E, is then compared against the hashes within min hash table 208 in steps 360 through 370. Upon comparison, two log entries may be identified having min hashes which match the min hash C D E of input query 400. These log entries may be C D E R and C D E F X.

As more than one log entry was identified in the example of FIG. 11, the search engine algorithm performs step 386 of identifying the more popular log entry. For example, the log entry C D E R may be more popular than log entry C D E F X. Thus, as shown, the results for search query C D E R are obtained (1, 2, 3 . . . ) and returned as the most closely correlated search results within data store 210 for input query A B C D E F. In alternative embodiments, it is understood that the search results for all matched queries (C D E R and C D E F X in the example of FIG. 11) may be returned and presented to the user as the most correlated results for the user's input query.

In the embodiments described above with respect to FIGS. 7 through 11, the algorithm begins with the largest k-min hash of the input query (k=m) to identify the stored query in log 206 with the largest min hash matching that of the input query. This allows search results to be quickly and resource-efficiently identified. In an alternative embodiment shown in a flowchart of FIG. 12, it is also understood that the algorithm may begin with the smallest k-min hash and work upward until the largest k-min hash having a match within table 208 is identified.

Figure 12:
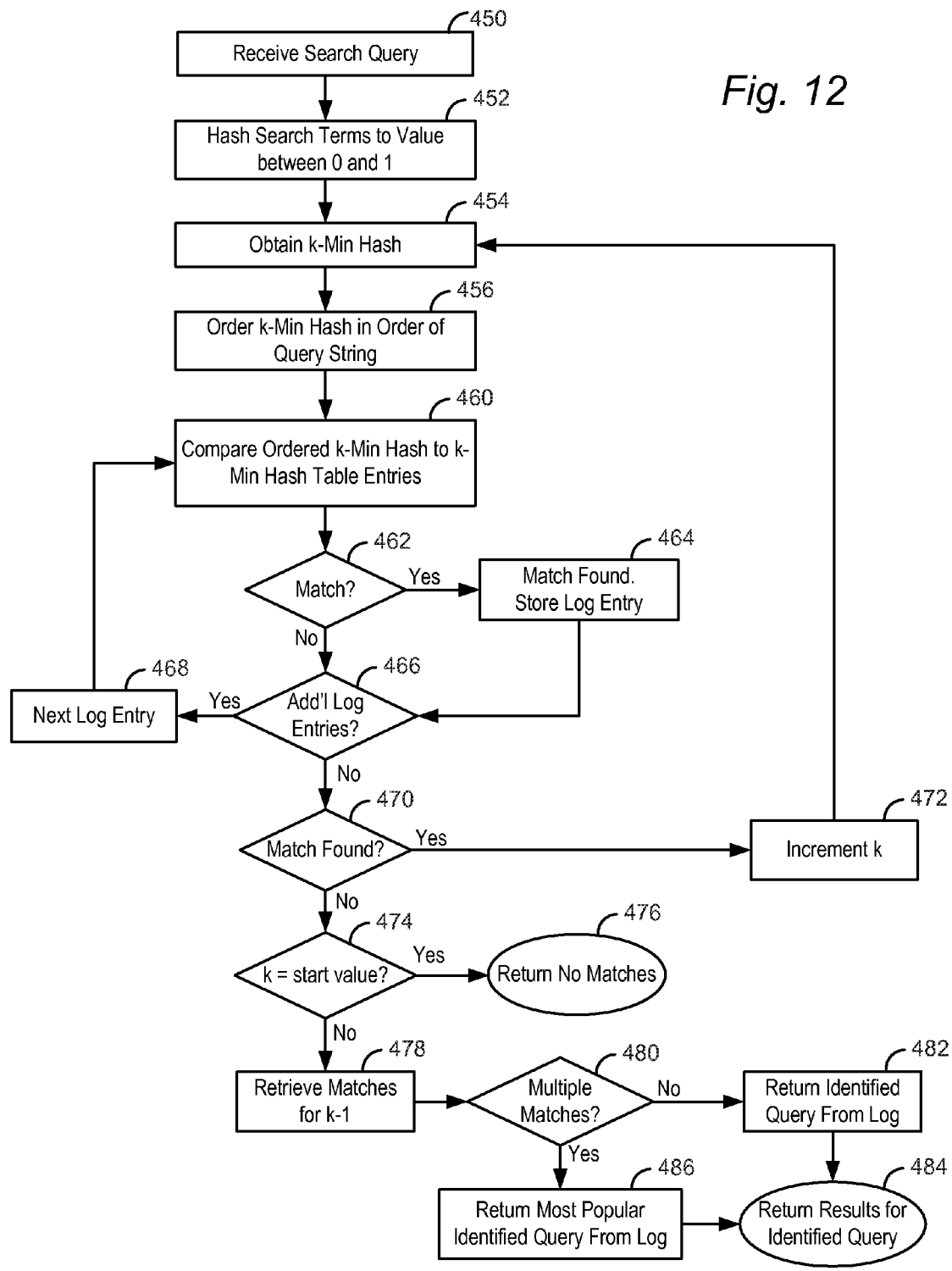
FIG. 12 is a flowchart of an alternative method of the present system for finding stored queries which are correlated to long input queries.

In particular, a query is received in step 450, and the terms of the query are hashed to a value between 0 and 1 in step 452 as described above. In step 454 the k-min hash of the search query is obtained. In the embodiment of FIG. 12, the value of k is initially selected as some minimum value. The value may be 1, or it may be greater than 1. In step 456, the k-min hash for the initial value of k obtained in step 454 is ordered in the same sequence as the tokens appear in the initial search query.

Steps 460 through 470 of FIG. 12 are the same as steps 360 through 370 described above with respect to FIG. 7. Namely, the min hash for the first value of k is compared against the stored min hashes in lookup table 208, and the associated stored queries for any matches found are stored in a buffer.

In the embodiment of FIG. 12, if one or more matches are found for a given value of k, k is incremented until the point where no matches are found. At that point, the matches found at k−1 are returned as the matching candidate results. Accordingly, in step 470 if a match was found and stored in the buffer, k is incremented in step 472 and the next k-min hash is again obtained in step 454 and steps 456 through 470 are repeated.

In the event that no match was found in step 470, the search engine algorithm checks in step 474 whether k is in fact at its initial value. If so, this indicates that no matches were found for any of the min hashes of the search query entered in step 450, and the algorithm indicates that no matches were found in step 476. As discussed above if the starting value of k is 1, it is unlikely that step 476 will be reached. However, in this embodiment, it is contemplated that initial values of k may be greater than 1, making it more possible for step 476 to be reached.

Assuming that k is not at its initial value in step 474, the match(es) found for the previous value of k are retrieved from the memory buffer in step 478. In step 480, the algorithm checks whether there were multiple matches for the previous value of k. If there was a single match, the query stored in log 206 from which the matched hash of table 208 is taken is returned in step 482. In step 484, the results for the identified query in log 206 are returned to the user as the most closely correlated search results to input query.

Conversely, if it is determined in step 480 that multiple min hashes were found in table 208 to match the previous k-min hash of the input query, the algorithm may return the most popular query of the matched min hashes in step 486, and return the search results for that most popular query to the user in step 484.

Search queries often include common terms, or "stop words," which are common words such as "the," "of" etc. Such stop words will result in a low hash value when hashed per the min hash function. Accordingly, when the min hashes are obtained, many min hashes stored in lookup table 208 will similarly include stop words and result in a high number of matches to the min hashes of the input query. Accordingly, in a further embodiment of the present invention, it is possible to weight the hash value of terms so that stop words receive higher hashed values than other, less common and more prohibitive terms in a given query.

In one embodiment, this waiting may be a TF-IDF (term frequency-inverse document frequency) weight, which is a known concept used in information retrieval and text mining. In general a TF-IDF weight is a statistical measure used to evaluate how important a word is within a given query. TF-IDF weight is explained in greater detail in Salton, G., *Introduction to Modern Information Retrieval*, McGraw Hill (1983). In general, TF-IDF weight is computed as $1/|q|.\log(N/(1+f))$, where $|q|$ is the length of the query, N is the number of queries in the query log and f is the number of queries in which the term occurs. Biasing the computed min hash values for the respective tokens in a search query in this way will result in the correlations from log 206 which are less likely to be matched based on stop words.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

We claim:

1. A method of finding one or more queries from a plurality of queries stored in a log that are semantically related to an input query, the method comprising the steps of:
   - (a) hashing each token in each of the input query and the plurality of stored queries to a value within a range of values having an upper and lower limit;
   - (b) determining, for each of the input query and the plurality of stored queries, a set of one or more subsequences, the composition of each subsequence based on the value obtained in said step (a), and the number of subsequences in each set of one or more subsequences based on the length of the query from which the subsequence is derived;
   - (c) ordering the tokens in the one or more subsequences of the input query in the order in which the tokens appear in the input query;
   - (d) ordering the tokens in the one or more subsequences of the respective stored queries of the plurality of stored queries in the order in which the tokens appear in the respective stored queries;
   - (e) comparing the one or more subsequences of the input query ordered in said step (c) against the one or more subsequences for the respective stored queries ordered in said step (d); and
   - (f) returning the results of one or more stored queries that have a subsequence matching a subsequence of the input query upon said comparing step (e).

2. A method as recited in claim 1, wherein said step (a) of hashing each token to a value within a range of values having an upper and lower limit comprises hashing the tokens using a min hash algorithm to a value of between 0 and 1.

3. A method as recited in claim 2, wherein said step (b) of determining a set of one or more subsequences comprises the step of determining a set of min hashes.

4. A method as recited in claim 1, wherein said step (b) of determining the number of subsequences in each set of one or more subsequences comprises the step of having a number of subsequences equal to between thirty percent and seventy percent of the number of tokens in query from which the subsequences are formed, rounded to a whole value.

5. A method as recited in claim 1, wherein said step (b) of determining the number of subsequences in each set of one or more subsequences comprises the step of having a number of subsequences equal to between fifty percent and sixty percent of the number of tokens in query from which the subsequences are formed, rounded to a whole value.

6. A method as recited in claim 1, wherein said step (b) of determining the number of subsequences in each set of one or more subsequences comprises the step of having three subsequences for queries having between four and six tokens, having four subsequences for queries having between seven and nine tokens, having five subsequences for queries having between ten and twelve tokens, and having six subsequences for queries having between thirteen and fifteen tokens.

7. A method as recited in claim 1, wherein said step (e) of comparing the one or more subsequences of the input query ordered in said step (c) against the one or more subsequences for the respective stored queries ordered in said step (d) comprises the step of comparing a subsequence of the input query having the largest number of tokens first against the one or more subsequences for the respective stored queries.

8. A method as recited in claim 7, wherein said step (e) of comparing the one or more subsequences of the input query ordered in said step (c) against the one or more subsequences for the respective stored queries ordered in said step (d) comprises the steps of selecting, for comparison against the respective store query subsequences, a new subsequence of the input query having one less than the largest number of tokens if no match is found upon comparing the subsequence of the input query having the largest number of tokens against the one or more subsequences for the respective stored queries.

9. A method as recited in claim 1, wherein said step (e) of comparing the one or more subsequences of the input query ordered in said step (c) against the one or more subsequences for the respective stored queries ordered in said step (d) comprises the step of comparing a subsequence of the input query having the fewest number of tokens first against the one or more subsequences for the respective stored queries.

10. A method as recited in claim 9, wherein said step (e) of comparing the one or more subsequences of the input query ordered in said step (c) against the one or more subsequences for the respective stored queries ordered in said step (d) comprises the steps of selecting, for comparison against the respective stored query subsequences, a new subsequence of the input query having one more than the fewest number of tokens if one or more matches are found upon comparing the subsequence of the input query having the fewest number of tokens against the one or more subsequences for the respective stored queries.

11. A method as recited in claim 1, further comprising the step of storing in a buffer all queries for which a subsequence for the respective stored queries was matched to a subsequence of the input query.

12. A method as recited in claim 11, wherein said step (f) of returning the results of one or more stored queries that have a subsequence matching a subsequence of the input query comprises the step of returning the results for the most popular stored query that has a subsequence matching a subsequence of the input query.

13. A method as recited in claim 11, wherein said step (f) of returning the results of one or more stored queries that have a subsequence matching a subsequence of the input query comprises the step of returning the results for at least two queries that have a subsequence matching a given subsequence of the input query.

14. A method of finding one or more queries from a plurality of queries stored in a log that are semantically related to an input query, the method comprising the steps of:
  (a) hashing each token in each of the input query and the plurality of stored queries to a value between 0 and 1 using a min hash algorithm;
  (b) determining, for each of the plurality of stored queries, a set of one or more min hashes, the number of min hashes in a set for a given stored query based on the number of tokens in the given stored query;
  (c) ordering the tokens in the one or more min hashes of the respective stored queries of the plurality of stored queries in the order in which the tokens appear in the respective stored queries;
  (d) determining, for the input query, a set of one or more min hashes, the number of min hashes in the set based on the number of tokens in the input query;
  (e) ordering the tokens in the one or more min hashes of the input query in the order in which the tokens appear in the input query;
  (f) starting with the min hash of the input query having the largest number of tokens and decreasing thereafter per step (g), comparing the one or more min hashes of the input query ordered in said step (e) against the one or more min hashes for the respective stored queries ordered in said step (d);
  (g) selecting another min hash of the input query having a smaller number of tokens and repeating said step (f) in the event no matching min hashes are found for a given min hash of the input query; and
  (h) returning the results of a stored query of a matched min hash in the event a matched min hash is found for a given min hash of the input query.

15. A method as recited in claim 14, further comprising the step of storing the min hashes determined for the one or more stored queries in said step (b) in memory prior to receiving the input query.

16. A method as recited in claim 14, wherein said steps (b) and (d) of determining the number of min hashes in a set of min hashes for a given query based on the number of tokens in the given query comprises the step of determining a smaller number of min hashes than there are tokens in the given query.

17. A method as recited in claim 14, wherein said step (h) of returning the results of a stored query of a matched min hash comprises the step of returning the results for the most popular stored query that has a min hash matching a min hash of the input query.

18. A method of finding one or more queries from a plurality of queries stored in a log that are semantically related to an input query, the method comprising the steps of:
  (a) hashing each token in each of the input query and the plurality of stored queries to a value between 0 and 1 using a min hash algorithm and an algorithm increasing the value of common terms;
  (b) determining, for each of the plurality of stored queries, a set of one or more min hashes, the number of min hashes in a set for a given stored query based on the number of tokens in the given stored query;
  (c) ordering the tokens in the one or more min hashes of the respective stored queries of the plurality of stored queries in the order in which the tokens appear in the respective stored queries;
  (d) determining, for the input query, a set of one or more min hashes, the number of min hashes in the set based on the number of tokens in the input query;
  (e) ordering the tokens in the one or more min hashes of the input query in the order in which the tokens appear in the input query;
  (f) comparing the one or more min hashes of the input query ordered in said step (e) against the one or more min hashes for the respective stored queries ordered in said step (d); and
  (g) returning the results of a stored query of a matched min hash in the event a matched min hash is found for a given min hash of the input query.

19. A method as recited in claim 18, wherein said step (a) of hashing each token using an algorithm increasing the value of common terms comprises the step of using a term frequency-inverse document frequency weighting algorithm.

20. A method as recited in claim 18, wherein said step (f) of comparing the one or more min hashes of the input query against the one or more min hashes for the respective stored queries comprises the step of beginning with the largest min hash of the input query and decreasing the size of the min hash until a match between a given min hash of the input query and one or more min hashes for the respective stored queries is found.

* * * * *